US006292714B1

(12) United States Patent
Okabayashi

(10) Patent No.: US 6,292,714 B1
(45) Date of Patent: Sep. 18, 2001

(54) ROBOT COOPERATION DEVICE, AND ROBOT COOPERATION PROGRAM STORAGE MEDIUM

(75) Inventor: Miwa Okabayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/775,652

(22) Filed: Feb. 5, 2001

(30) Foreign Application Priority Data

May 12, 2000 (JP) ................................................. 12-140627

(51) Int. Cl.⁷ ........................................................ G06F 19/00
(52) U.S. Cl. ........................... 700/245; 700/257; 700/264; 29/703; 29/720; 29/784; 219/124.02; 345/435; 345/520; 345/521
(58) Field of Search ...................................... 700/245, 212, 700/257, 264, 11, 56, 83, 86, 17, 45; 29/703, 720, 784, 787, 795; 219/124.02; 345/435, 8, 520, 521; 434/308, 323; 382/155

(56) References Cited

U.S. PATENT DOCUMENTS

| | | | |
|---|---|---|---|
| 4,843,568 | * | 6/1989 | Krueger et al. ....................... 382/100 |
| 5,642,093 | * | 6/1997 | Kinoshita et al. .................... 382/209 |
| 5,790,403 | * | 8/1998 | Nakayama ............................. 701/28 |
| 5,901,246 | * | 5/1999 | Hoffberg et al. ..................... 382/209 |
| 5,903,454 | * | 5/1999 | Hoffberg et al. ....................... 700/83 |
| 6,061,064 | * | 5/2000 | Eeichlen ................................. 345/418 |

OTHER PUBLICATIONS

Murray et al., Active Tracking, 1993, IEEE, pp. 1021–1028.*
Nishimura et al., Spotting Recognition of Gestures Performed by People from a Single Time–Varying Image, 1997, IEEE, pp. 967–972.*
Yachida et al., Understanding Spatial Configuration of Robot's Environment from Stereo Motion Images, 1991, IEEE, pp, 882–887.*
Nishimura et al., Effect of Time–Spatial Size of Motion Image for Localization by Using the Spotting Method, 1996, IEEE, pp. 191–195.*

* cited by examiner

Primary Examiner—William A. Cuchlinski, Jr.
Assistant Examiner—McDieunel Marc

(57) ABSTRACT

A robot control part connected to a robot moving according to control for controlling the motion of the robot; and a media reproduction part to keep scenarios which describes changes in images to the passage of time, and are corresponding to events, present images according to the passage of time following the above scenario, and notify the passage of time at each frame to the robot control part; characterized in that the above robot control part keeps motion procedures denoting changes, which are corresponding to the frame, in the postures of the above robot to the passage of time; receives notifications of the passage of time from the above media reproduction part; and moves the above robot according to the above motion procedures, in the corresponding frame.

18 Claims, 13 Drawing Sheets

ROBOT COOPERATION DEVICE, AND ROBOT COOPERATION PROGRAM STORAGE MEDIUM

BACKGROUND OF THE INVENTION

1. Field of the Invention

The present invention relates to a robot cooperation device with connected robots moving according to control to provided images according to the passage of time, and to move the robots in cooperation with the provided images; and to a robot cooperation program storage medium storing robot cooperation programs to operate a computer as the above robot cooperation device.

2. Description of the Related Art

Conventionally, there has been well-known multimedia contents software, which provides information (images, voices and the like) using multimedia such as images, voices and the like. Generally, in multimedia contents software editing execution system which performs editing or execution on the above multimedia contents software, a keyboard and a mouse are used as an input device, and a display screen is mainly used as an output device. Media such as images (still pictures, dynamic images and texts), and voices are assumed to be operated by the above multimedia contents software editing execution system. An idea, itself, of execution of external media different from the above images and voices has been existed, but, a multimedia contents software editing execution system using robots as an output device has never been existed so far as a product. Moreover, there have been proposed only some ideas for a method to perform only start and termination of software for execution of the external media other than robots, simultaneously with time characteristics of the multimedia contents software.

A current multimedia contents editing execution system has an internal structure (Macromedical Director and the like), where new media may be handled by addition of modules due to a configuration in which parts for control of respective media have modules corresponding to respective media. In such a system, media control modules are required to have the following functions, the above system executes multimedia contents by proper calling of the above functions according to given scenarios.

At execution: a function to operate media according to time.

a function to add means (such as a script function) to the main body; and a function to send events caused in the media to multimedia contents software; and at editing: a function to edit the media.

There have been the following problems, as robots are different from usual media, when operation of the robots is added to the multimedia contents editing execution system by using the above structure of modules.

It is unsuitable for control of the robots requiring strict time management as the time management depends on the main body system side.

The numbers and kinds of the motion parts and sensors and the like are different from each other according to the robots. That is, as there are many changes in the hardware in the case of the robots, compared with those of the media, it is required to create the modules to the above changes at every change.

Considering the above circumstances, the present invention has an object to provide a robot cooperation device with a capability to operate robots in cooperation with motions of images; and a robot cooperation program storage medium storing robot cooperation programs to operate a computer as the above robot cooperation device.

SUMMARY OF THE INVENTION

In order to realize the above object, a robot cooperation device according to the present invention comprises:

a robot control part connected to a robot moving according to control for controlling the motion of the robot; and a media reproduction part to keep scenarios, which describes changes in the images to the passage of time, and are corresponding to events; present images according to the passage of time, following the scenario; and notify the passage of time at each frame to the above robot control part, characterized in that the above robot control part keeps motion procedures denoting changes, which are corresponding to the frame, in the postures of the above robot to the passage of time; receives notifications of the passage of time from the above media reproduction part; and moves the above robot according to the above motion procedures, in the corresponding frame.

The robot cooperation device according to the present invention has a configuration where it has motion procedures for time management of the robot control, independent of the scenario to control the motions of images; receives notifications of the passage of time from the scenario; and moves the robot according to the motion procedures. Thereby, free motion control of the robot linked to the motions of the images may be realized according to the robot cooperation device of the present invention.

Here, preferably, in the robot cooperation device of the above present invention, the above robot connected to the above robot control part comprises a sensor to transmit a sensor detection signal to the above robot control part;

the above robot control part transmits events corresponding to the sensor detection signals which are transmitted to the above media reproduction part; and the above media reproduction part starts or branches the above scenario according to the events which has been transmitted from the above robot control part.

As described above, further more cooperative motion between the robot cooperation device and the robot may be realized as they influence each other by provision of the sensor in the robot, and by starting or branching the scenario mainly to control the images according to the detection signal of the sensor of the robot.

It is also preferable that, in the robot cooperation device of the above present invention, the media reproduction part further keeps the scenario where the voice instruction to the passage of time is described, other than changes of the images to the passage of time; presents the images and the voices to the passage of time according to the scenario; and notifies the passage of time for each frame to the robot control part.

Cooperative motions much richer in expression may be realized by presentation of not only images but also voices.

Moreover, in the above robot cooperation device according to the present invention, the above media reproduction part notifies the passage of time for each frame to the above robot control part, and requests the robot motion.

Preferably, the above robot control part receives the request for the robot motion from the above media reproduction part to perform a motion corresponding to the motion request.

An robot motion according to the circumstances, that is, not only previously determined robot motion for each frame, but also, for example, motion by instruction from a user may be possible by a configuration where motion request for the robot motion to the robot control part from the media reproduction part.

Preferably, in the above case, priority is given to the motions of the above robot, and the above robot control part continues or switches the motions, according to comparison results between the priority of the motion under execution and that of the motion corresponding to the requested motion, when the request for the robot motion from the above media reproduction part is received during motion of the above robot.

When it is assumed that the request for the robot motion may be possible from the media control part, there may be a possibility to receive the motion request from the media reproduction part, during control of the robot motion by the robot control part. In the above case, collision of the motion instructions for the robot motion may be avoided, by continuation or switching of the motion according to the priority which has been previously given to the motion as described above.

Moreover, in the above robot cooperation device of the present invention, the above robot control part comprises: a robot proper module which is activated according to the type of the robot connected to the robot control part to control the motion of the robot; and a robot common module to keep the above motion procedures, and to give the above robot proper module instructions to perform motions according to a motion procedure table.

As described above, it is expected that, compared with those of the media, there are more changes in the hardware in the case of the robots, for example, numbers of motion parts, sensors and the like depends on the robot. Then, there is caused easier dealing with the case where another type of robots are connected to the robot cooperation device, by a configuration described as above in which parts depending on the type of the robot is made as a robot proper module independent of the robot common module which does not depend on the type of the robot.

Moreover, when parts depending on the type of the robot is configured as a robot proper module as described above, it is preferable to comprise a connection robot retrieval part which identifies the type of the robot connected to the above robot control part by retrieval, and activates the robot proper module, among robot proper modules, according to the identified type of the robot connected to the robot control part.

A user is not required to consciously switch modules by the above configuration, and an appropriate module is always activated.

And, in the above robot cooperation device according to the present invention, it is preferable to comprise: a display part to display an image expressing the robot connected to the above robot control part, with buttons for definition of motions of the robot; an operation part for operation including operation of the buttons displayed on the above display part; and a script forming part to form script describing the motions of the above robot according to the operation of the above operation part.

It is possible to intuitively perform easy definition of motions of the robot with the above configuration.

Moreover, preferably, in the above robot cooperation device according to the present invention, the robot connected to the robot control part comprises a plurality of sensors, and each sensor detection signal based on each sensor is transmitted to the robot control part;

the above robot control part stores the order of the sensor detection signals for a part of or all of the above plurality of sensors; events are transmitted to the above media reproduction part according to the above order when the sensor detection signals are received from the above robot in the stored order; and the above media reproduction part starts or branches the above scenario according to the event transmitted from the above robot control part.

Transmission of events by unnecessary sensor detection signal from the robot sensors may be avoided through the above configuration.

And, in order to achieve the above object, a robot cooperation program storage medium according to the present invention is loaded in a computer to which a robot moving according to control is connected;

the computer comprises:
    a robot control part to control the motion of the connected robot; and
    a media reproduction part to describe changes of images to the passage of time; to keep a scenario corresponding to events; to present the images according to the passage of time following the above scenario; and to notify the passage of time for each frame to the robot control part;
    the characters of the robot control part is: to keep motion procedures denoting changes, which are corresponding to the frame, in the postures of the above robot to the passage of time; to receive notifications of the passage of time from the above media reproduction part; and to store a robot cooperation program to move the above robot in the corresponding frame according to the above motion procedures as the robot cooperation device, The robot cooperation program stored in the robot cooperation program storage medium according to the present invention is loaded in a computer. Thereby, the computer may be operated as the robot cooperation device according to the present invention.

DETAILED DESCRIPTION OF THE INVENTION

Hereinafter, one embodiment of the present invention will be described.

Figure 1:
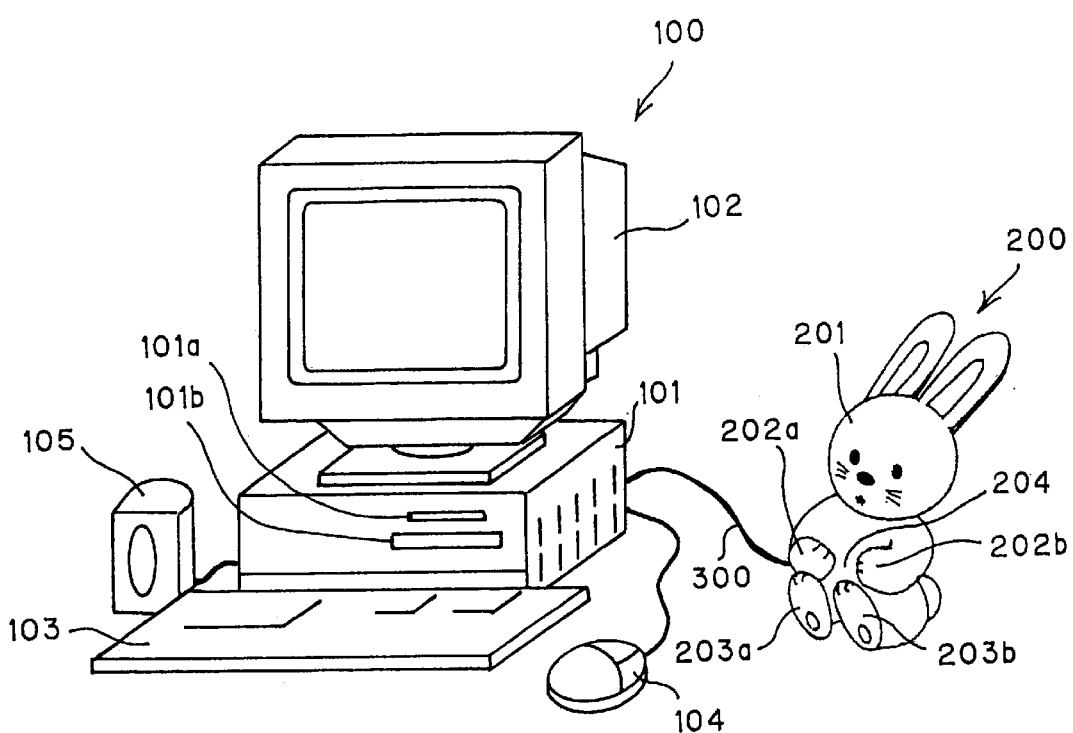
FIG. 1 shows a view of an appearance of a computer, which is used as one embodiment according to the present invention, and a robot connected to the above computer.

FIG. 1 shows a view of an appearance of a computer, which is used as one embodiment according to the present invention, and a robot connected to the above computer.

A computer 100 comprises: a main body 101 provided with built-in devices such as a CPU (central processing unit), a RAM (random access memory), a magnetic disk, a communication board; a CRT (cathode-ray tube) display unit 102 to display a screen according to instructions from the above main body 101; a Keyboard 103 to input the instructions and character information of a user into the above computer; a mouse 104 to input instructions according to icons and the like displayed at a specified position among any arbitrary positions on the display screen of the CRT display unit 102; and a speaker 105 to convert voice signals output from the main body 101 to voices for output.

The main body 101 comprises a floppy disk entry 101a, and an MO entry 101b for demountable loading of floppy disks and MOs (magneto optical disks) for appearance, in which a floppy disk and an MO drive are built for driving the loaded floppy disks and MOs.

A robot 200 is connected to the main body 101 of the computer 100 through a cable 300, and is configured to move a head part 201, right and left arm parts 202a and 202b, and right and left foot parts 203a and 203b, according to control signals from the computer 100. Moreover, a speaker, independent of a speaker 105 shown in FIG. 1, is built in the robot 200 to generate voices according to voice signals from the computer 100. And, the head part 201, right and left arm parts 202a and 202b, and an abdomen part 204 are provided with each sensors, respectively, corresponding sensor detection signals are output, when a user taps the head part by the hand, or move a right or left arm, and are transmitted to the computer 100 through a cable 300.

Figure 2:
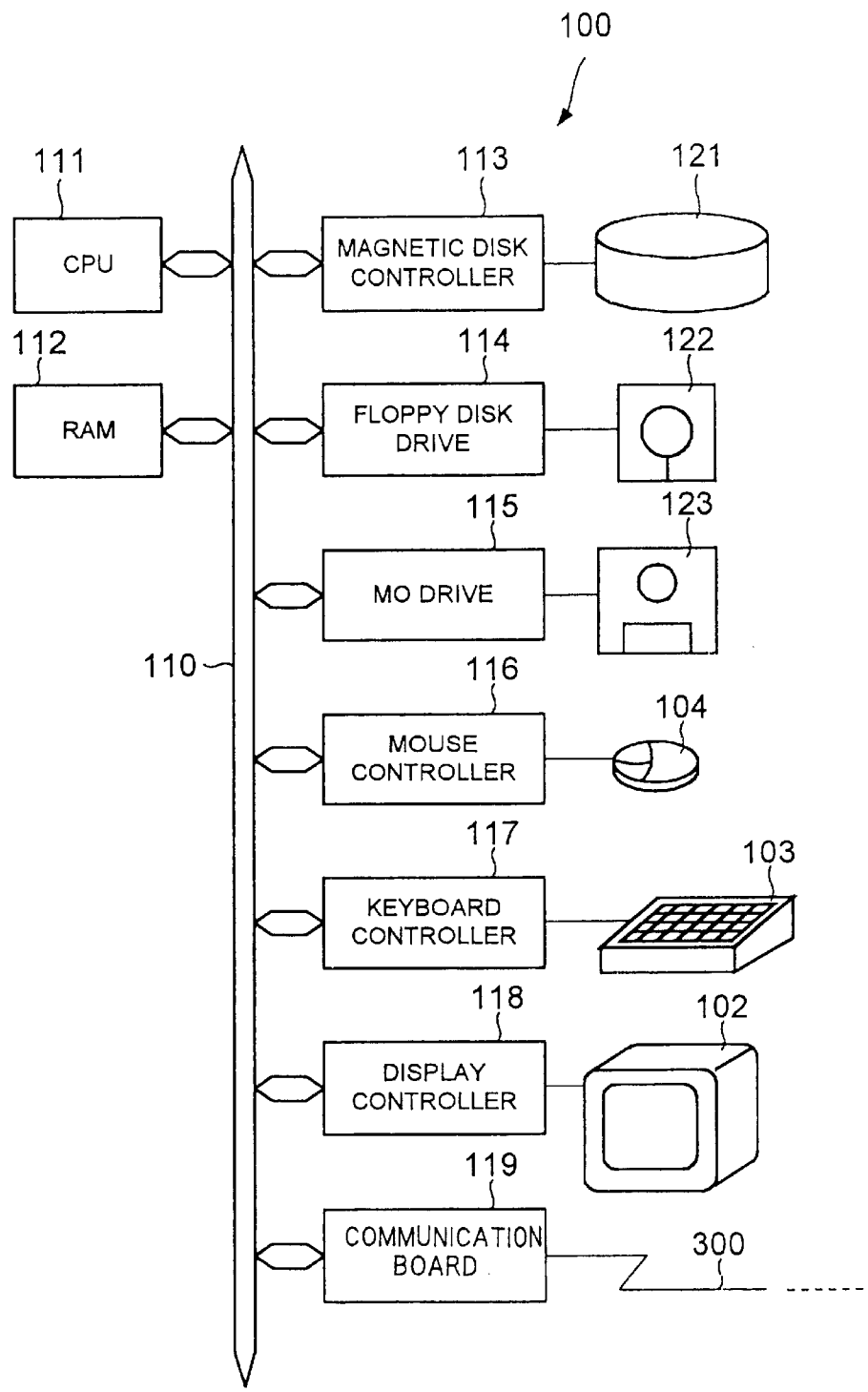
FIG. 2 shows a view of a hardware configuration of the computer shown in FIG. 1.

FIG. 2 shows a view of a hardware configuration of the computer shown in FIG. 1.

In the drawing of the hardware configuration, a CPU 111, a RAM 112, a magnetic disk controller 113, a floppy disk drive 114, an MO drive 115, a mouse controller 116, a keyboard controller 117, a display controller 118, and, a communication board 119 are shown, and they are connected to a bus 110, each other.

The magnetic disk controller 113 is for access to a magnetic disk 121 built in the main body 101 (See FIG. 1).

And the floppy disk drive 114, and the MO drive 115 are installed with a floppy disk 122 and a MO 123, respectively, as described referring to FIG. 2 for access to them.

A mouse controller 116, and a keyboard controller 117 transmit the operations at the mouse 104 and the keyboard 103 to the inside of the computer, respectively.

In addition, the display controller 118 is a controller to display images on the CRT display unit 102 according to programs operated by CPU 111.

The communication board performs communication with the robot 200 shown in FIG. 1 through the cable 300 to send control signals to the robot 200 for motion of the robot 200, and has a function to receive detection signals of the robot sensors.

The computer 100 in which programs stored in the floppy disk 122 and MO 123 are installed functions as the robot cooperation device according to the present invention. Therefore, one embodiment of the robot cooperation device according to the present invention is realized here as a combination of the hardware of the computer shown in FIG. 1 and FIG. 2, and programs installed in the above computer for execution. The programs operating the above computer as the robot cooperation device of the present invention corresponds to the robot cooperation programs according to the present invention. When the robot cooperation programs are stored in the floppy disk 122 and the MO 123, the floppy disk 122 and the MO 123 storing the above robot cooperation programs correspond to the robot cooperation program storage medium according to the present invention. Moreover, when the above robot cooperation programs are installed in the above computer, the installed robot cooperation programs are stored in the magnetic disk 121. Therefore, the magnetic disk 121 storing the robot cooperation programs also correspond to one embodiment of the robot cooperation program storage medium according to the present invention.

Figure 3:
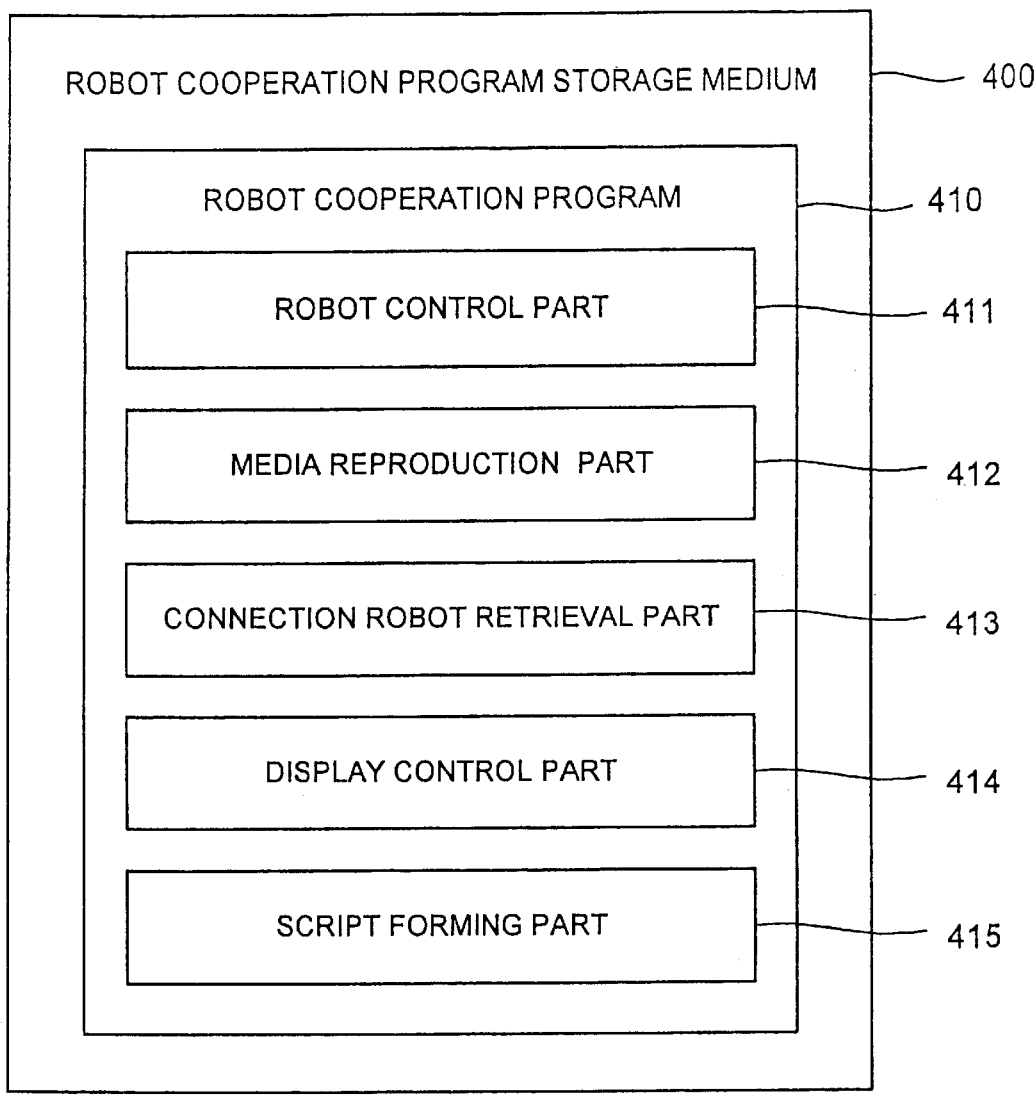
FIG. 3 shows a view of a schematic configuration of a robot cooperation programs stored in one embodiment of a robot cooperation program storage medium according to the present invention.

FIG. 3 shows a view of a schematic configuration of the robot cooperation programs stored in one embodiment of the robot cooperation program storage medium according to the present invention. A robot cooperation program storage medium 400 shown in FIG. 3 illustrates a typical example for the floppy disk 122, the MO 123, the magnetic disk 121 and the like shown in FIG. 2 in a state that the robot cooperation programs are described in them.

The robot cooperation program storage medium 400 storing a robot cooperation program 410 comprises: a robot control part 411, a media reproduction part 412, a connection robot retrieval part 413, a display control part 414, and a script forming part 415.

The robot control part 411 has a function to control the motion of the connected robot 200.

Moreover, the media reproduction part 412 describes changes of images to the passage of time; keeps a scenario corresponding to events; presents the images according to the passage of time following the above scenario; and notifies the passage of time for each frame to the robot control part 411.

Here, the robot control part 411 keeps motion procedures denoting changes, which are corresponding to the frame, in the postures of the above robot to the passage of time; receives notifications of the passage of time from the above media reproduction part 412; and moves the above robot 200 in the corresponding frame according to the above motion procedures.

And, the robot control part 411 transmits an event corresponding to a sensor detection signal transmitted from the robot connected to the computer 100 to the media reproduction part 412, which starts or branches the scenario according to the event transmitted from the robot control part 411.

In the above case, the above robot has a plurality of sensors, and transmits to the computer each sensor detection signal caused by the plurality of sensors, and the robot control part 411 stores the order of the sensor detection signals for all the plurality of sensors or a part of them. When the sensor detection signals are received from the robot according to the stored order, it may be configured to perform setting so as to transmit the events according to the above order to the media reproduction part 412.

Moreover, the media reproduction part 412 keeps the scenario where the voice instruction to the passage of time is described, other than changes of the images to the passage of time; presents the images and the voices to the passage of time according to the scenario; and notifies the passage of time for each frame to the robot control part 411.

In addition, the media reproduction part 412 notifies the passage of time for each frame to the robot control part 411, and requests for the robot motion. The robot control part 411 receives the above request from the media reproduction part 412 to move the robot according to the above request.

Further, priority is given to the motions of the robot, and the robot control part 411 continues or switches the above motions, according to comparison results between the priority of the motion under execution and that of the motion corresponding to the requested motion, when the request for the robot motion from the above media reproduction part 412 is received during motion of the robot.

The robot control part 411 comprises: a robot proper module which is activated according to the type of the robot connected to the computer to control the motion of the robot; and a robot proper module to keep the above motion procedures, to receive the request for the robot motion from the media reproduction part 412, and to give the above robot proper module instructions to perform motions according to the above motion procedures.

The connection robot retrieval part 413 retrieves the type of the robot connected to the computer, and activates the robot proper module according to the type of the robot connected to the computer among the robot proper modules.

And, the display control part 414 displays images expressing the robot with buttons for definition of motions of the robot; and the script forming part 415 forms script describing the motions of the robot according to the operation of the operation part including the operation of the displayed buttons.

Hereinafter, more specific embodiments will be described.

Figure 4:
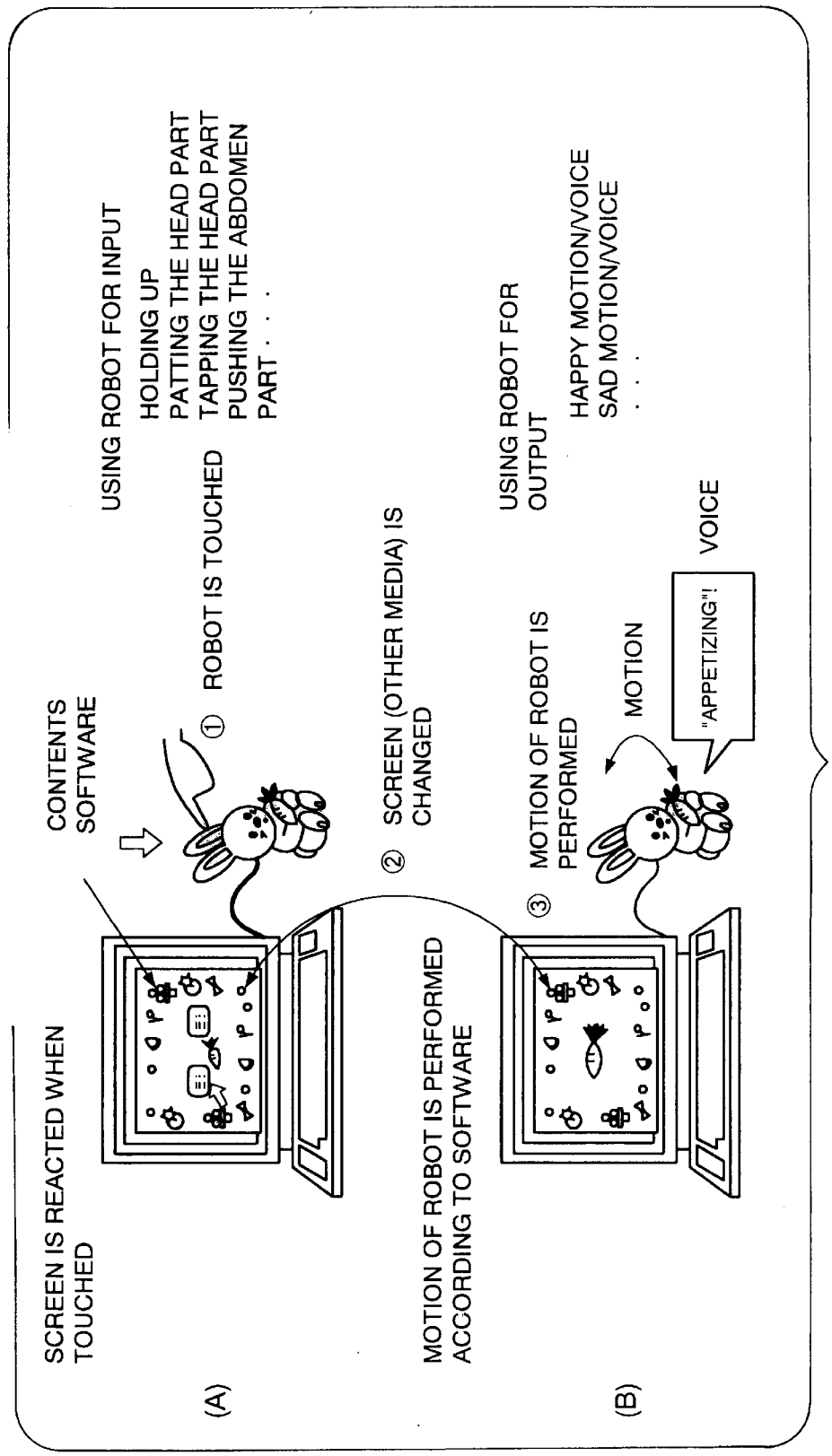
FIG. 4 shows a schematic explanatory view of cooperation motions of the robot cooperation device according to the present invention with the robot.

FIG. 4 shows a schematic explanatory view of cooperation motions of the robot cooperation device according to the present embodiment with the robot.

An image moving according to the scenario previously defined is displayed on the display screen of the computer by execution of contents software in the computer. In the above state, when the robot is touched as shown in FIG. 4(A), the robot sensor detects the touching to transmit it to the computer. Thereafter, the contents software under execution in the computer responds to it, and the images is changed according to it. On the other hand, as shown in FIG. 4(B), the control signal is sent from the contents software side to the robot, according to the progress of the scenario or according to the operation of a keyboard and a mouse by a user, and the robot moves according to the control signal.

The robot cooperation device according to the present embodiment is a device to execute the above cooperation motion between the images and the robot.

Figure 5:
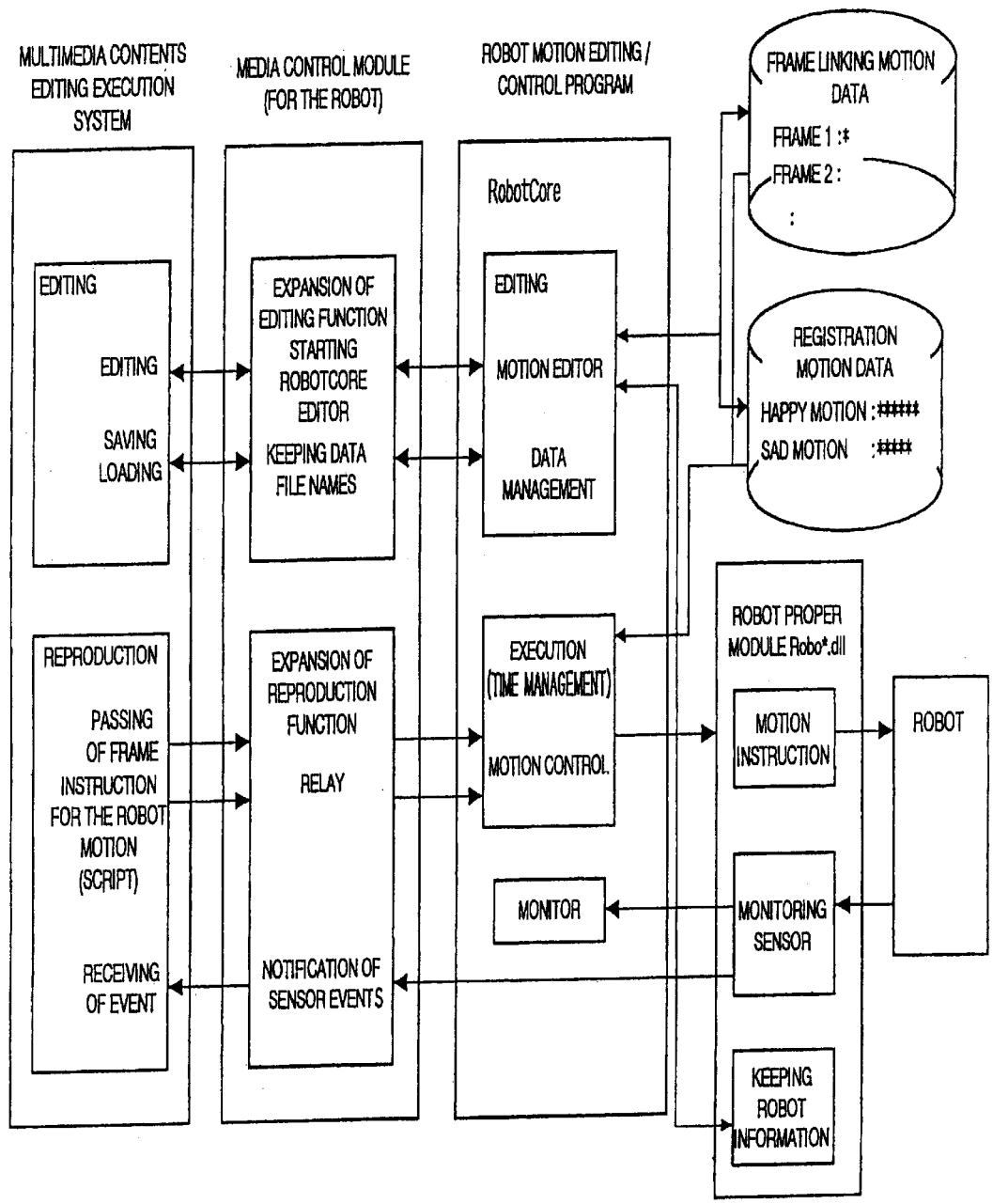
FIG. 5 shows a function block diagram of the robot cooperation device according to the present invention, focusing on software (robot cooperation program).

FIG. 5 shows a function block diagram of the robot cooperation device according to the present embodiment, focusing on the software (robot cooperation program).

Here, the robot cooperation program comprises: a multimedia contents editing execution system; a media control module (for the robot); a robot motion editing/control program; and a robot proper module, as shown in the drawing.

The robot proper module performs communication with the robot.

Then, the robot motion editing/control program manages frame linking motion data and registration motion data, which denote the motion procedures for the robot. The description of the above data will be performed later.

The multimedia contents editing execution system is a core part for edition and execution of the multimedia contents, and conventional system may be used for the part. As described above, in an existing multimedia contents editing execution system, the editing/control part of media is respectively made as one module, and has an internal structure where new media may be further hand led by addition of new modules. Here, a media control module (for the robot) is prepared to handle new media of the robot. The above media control module (for the robot) comprises the above described functions, like other media control modules (not shown), that is:

At execution: a function to operate media according to time;

a function to add means (such as a script function), which operates media to a main body; and a function to send events caused in the media to multimedia contents software; and at editing: a function to edit the media.

The media control module executes the above functions after calling from the main body of the multimedia contents editing execution system.

The above media control module performs communication with the robot motion editing/control program. At execution (at reproduction of the multimedia contents software), the event is sent to the robot motion editing/control program through the media control module, when the frame (one scene of the scenario) is reproduced in the system. In the robot motion editing/control program, control of the robot is started after operation which will be described referring to FIG. 6.

Here, parts depending on the type of the robot (for example, communication with the robot, GUI (graphical user interface) at editing, description of parameters and the like (will be described later)) are modularized as robot proper modules. The above proper modules are provided for each type of the robots which have the possibility to be connected, and each robot proper module keeps robot information for identification of the type of the robot for cooperation control. When the system shown in FIG. 5 is activated under connection of a specified robot to the system, the robot proper module corresponding to the connected robot is loaded from the magnetic disk to become ready for the robot motion. However, the open function of the above robot proper module is the same, independent of the types of the robot. Thereby, the common robot motion editing/control program may be used for the connected robot, regardless of the types.

Here, in the comparison with the robot cooperation program, the combination of the multimedia contents editing execution system and the media control module (not shown) controlling media such as images and voices other than the robot, corresponds to the media reproduction part; the combination of the robot motion editing/control program and the robot proper module corresponds to the robot control part; and the media control module (for the robot) corresponds to the connection part for communication between those media reproduction parts and the robot control part. Moreover, the robot motion editing/control program simultaneously corresponds to the connection robot retrieval part, the display control part and the script forming part in the robot cooperation program according to the present invention.

When editing of the multimedia contents is performed, a user gives an instruction for edition concerning the robot to the multimedia contents editing execution system. Thereafter, the editing instruction is transmitted to the media control module (for the robot), and the media control module (for the robot) activates the robot motion editing/control program then, the user specifies the motion of the robot.

FIG. 5 shows frame linking motion data and the registration motion data, and the latter denote that a series of robot motions correspond to motion names given the series of motions (for example, happy motion, sad motion and the like in FIG. 5). When the above registration motion data are previously defined, specification of a series of a plurality of motion names may lead to specification of the whole series of a plurality of motions.

Moreover, the frame linking motion data denote the robot motions linked to frames. Motion names which denote a series of motions defined as registration motion data may be included in the frame linking motion data.

When there is a saving command of edited results after editing of the robot motions linked to the frames, the media control module (robot) keeps only file names of files, in which data denoting the motions of the edited results are stored, in a form in which the names may be used for reference by the multimedia contents editing execution system at reproduction, and the files denoted by the above file names themselves (that is, data denoting the robot motions themselves) are saved in a form in which the robot motion editing/control program manages them. That is, the frame linking motion data of the robot, other than the scenario which is referred to in the multimedia contents editing execution system, may be managed by the robot motion editing/control program for control of the robot motions as a motion procedure according to the present invention.

Though editing of the robot motions is described here, a scenario performing editing and the like of images displayed on a screen, and voices output from a speaker may be formed in other cases. The above other cases are similar to conventional ones to eliminate detailed descriptions.

At reproduction, images and voices are presented according to the scenario. Also, events passing through each frame are transmitted to the robot motion editing/control program, through the media control module (for the robot). In the robot motion editing/control program, the existence of the frame linking motion data corresponding to the current frame is checked according to the events passing through the frame, and when there is the frame linking motion data corresponding to the current frame, the above data are sent to the robot proper module. The robot proper module gives a motion instruction to the robot based on the above data.

The robot proper module monitors the robot sensors: when the robot sensors detect added operation to the robot, for example, they detect that the headpart of the robot is tapped, the detection may be displayed on the monitor screen, or they may be notified to the media control module (for the robot). The notification is further notified to the multimedia contents editing execution system as an event. When the multimedia contents editing execution system receives the event, it branches the scenario according to it to cause changes in the images on the screen or outputs of voices.

Moreover, the multimedia contents editing execution system gives not only the notification of the frame passing-through but also the motion instruction for the robot motion to the media control module (for the robot).

The robot motion is described in the script form. The motion instruction of the above robot motion is performed according to previously determined events (for example, operation of a keyboard, a mouse or that of the robot or the like by a user) which are notified to the multimedia contents editing execution system.

The motion instruction for the above robot motion is transmitted to the robot motion editing/control program through the media control module (for the robot), and the robot motion editing/control program interprets the motion instruction, for example, decomposes the motion data by reference of the registration motion data, and passes the motion data obtained by the interpretation to the robot proper module, when motion names given to a series of motions such as "happy motion" are included in the above instruction of the motion. The robot proper module gives a motion instruction to the robot based on the motion data.

Figure 6:
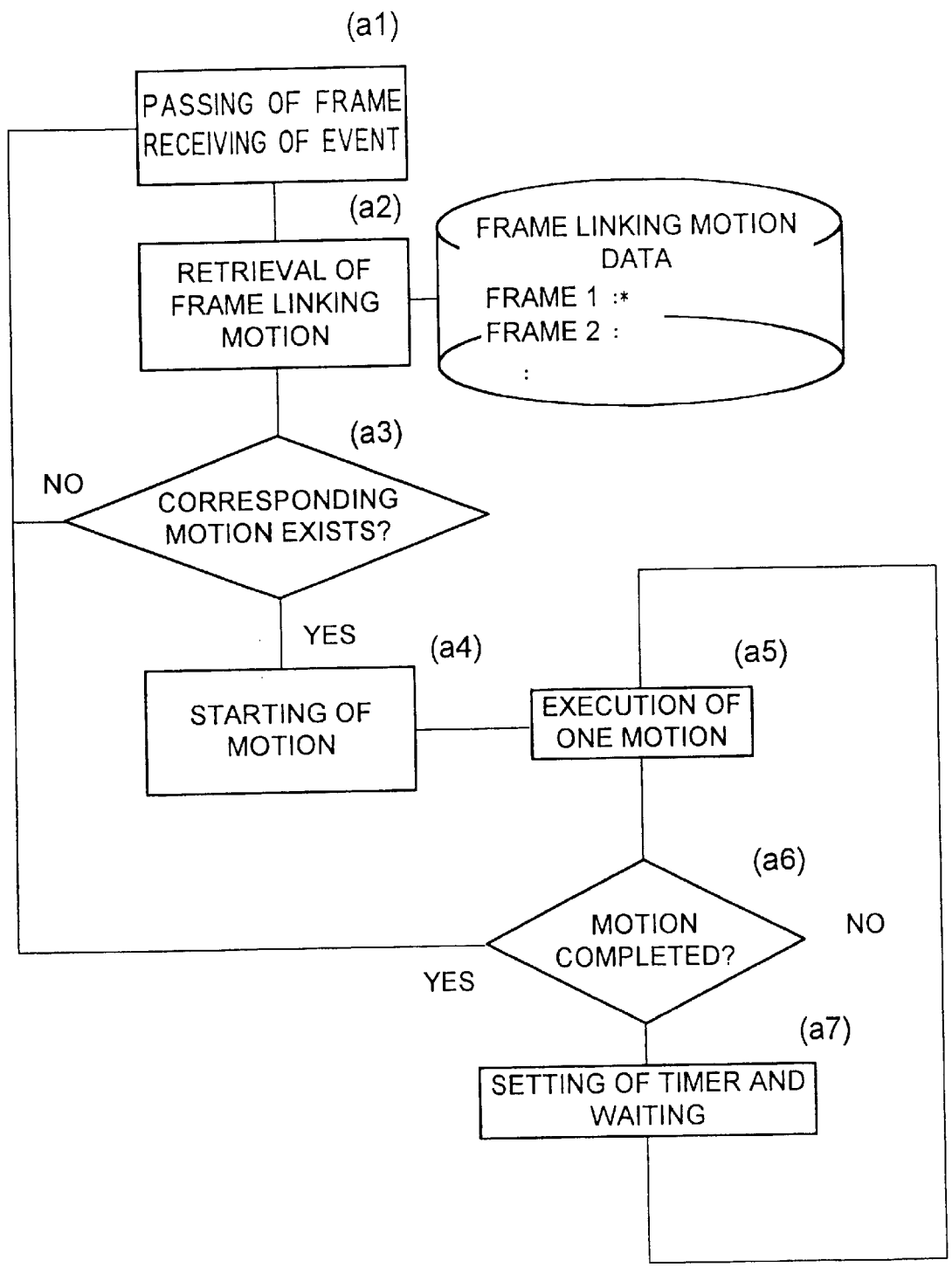
FIG. 6 shows a flowchart of operations of a robot motion editing/control program at reproduction.

FIG. 6 shows a flowchart of operations of the robot motion editing/control program at reproduction.

When the multimedia contents editing execution system shown in FIG. 5 issues the frame passing-through event, the frame passing-through event is received by the robot motion editing/control program through the media control module (for the robot) for operations shown in FIG. 6.

In the robot motion editing/control program, when the frame passing-through event is received (step a1), retrieval is performed for checking the existence of motion data of the robot linking to frames corresponding to the above event (step a2). When there is no existence of the corresponding motion data, the processing proceeds to a step for waiting for the next event (step a3). When the corresponding motion data exists (step a3), the motion starts (step a4). When there are a plurality of motions linking to the frame, in the first place, one motion is executed (step a5), and it is judged whether all the motions linking to the frame are completed or not (step a6) at execution of the motion. At completion of all the above motions, the operation is in a state where the next frame passing-through event is awaiting receiving. When there is left the next motion linking to the frame, timer setting for waiting for starting of the next motion is performed to be in an awaiting state (step a7). At the time for starting the next motion, the processing returns to step a5 to execute the next motion. As mentioned above, the above steps 5–7 are repeated, as long as the next motion exists.

Figure 7:
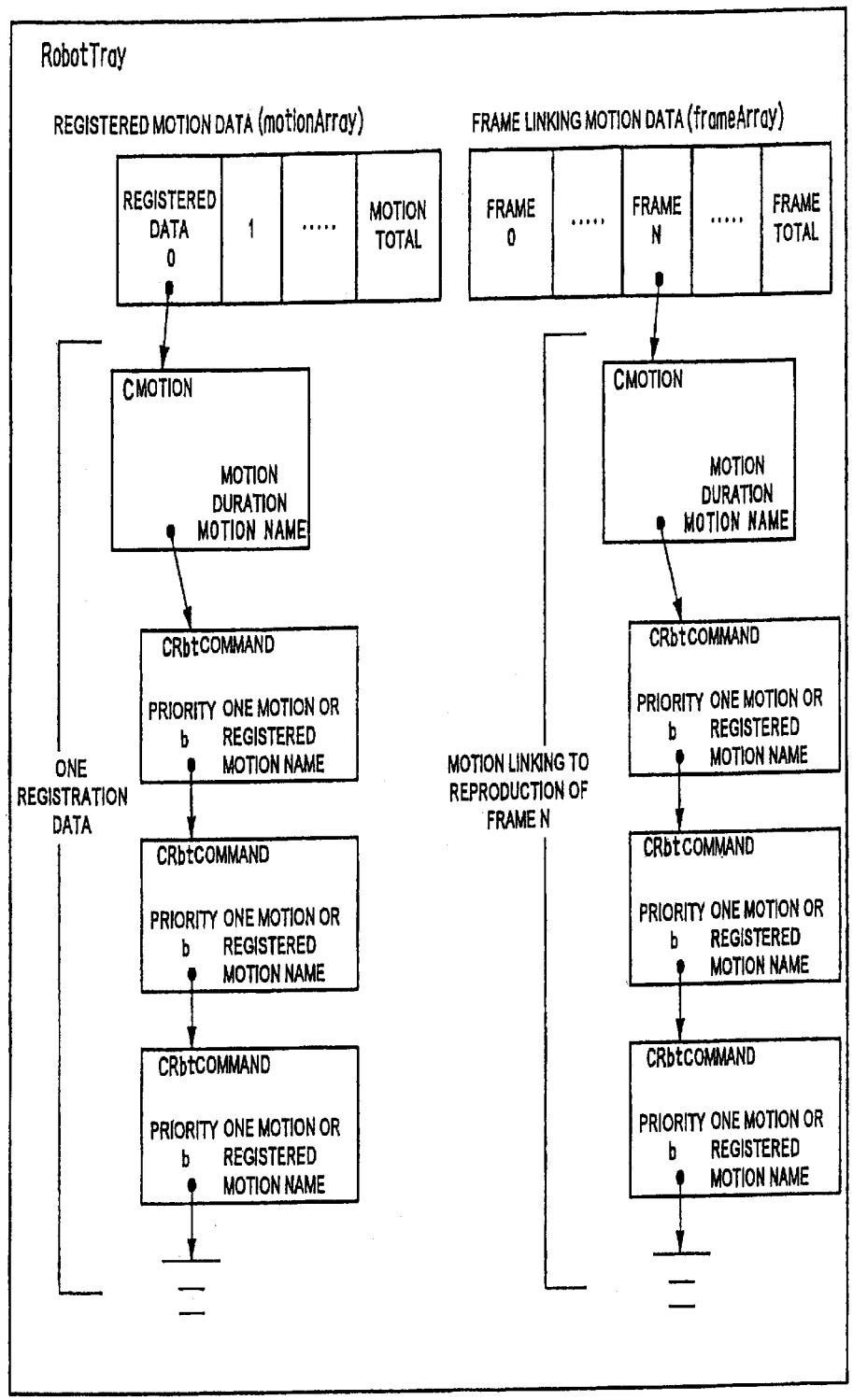
FIG. 7 shows a view of a structure of motion data in the robot motion editing/control program.

FIG. 7 shows a view of a structure of motion data in the robot motion editing/control program. The registration motion data and the frame linking motion data, which are described referring to FIG. 2, are shown in FIG. 7.

The main window class RobotTray of the robot motion editing/control program has the registration motion data and the frame linking motion data as an array of the pointer of the CMotion class. CMotion denotes one of registration motions, and has a list of the CRbtCommand class. RbtCommand denotes each unit motion of a series of motions. Here, MOTION_TOTAL, and FRAME_TOTAL denote number of a unit motion comprising a series of motion and the number of frames, respectively.

A priority b is given to each RbtCommand denoting each unit motion. The priority b is expressed as "b" in the same way here, but it may be different (or the same) according to each RbtCommand.

The motion under execution is stopped and execution of new motion according to the received instruction for the robot motion is started in the case of higher priority of the motion according to the motion instruction, when the robot motion editing/control program receives the motion instruction from the multimedia contents editing execution system during motion of the robot. In the present embodiment, the priority is high at starting of a series of motions, and gradually become lower along with progress of the motion as the priorities are given to each unit motion one by one as shown in FIG. 7.

Figure 8:
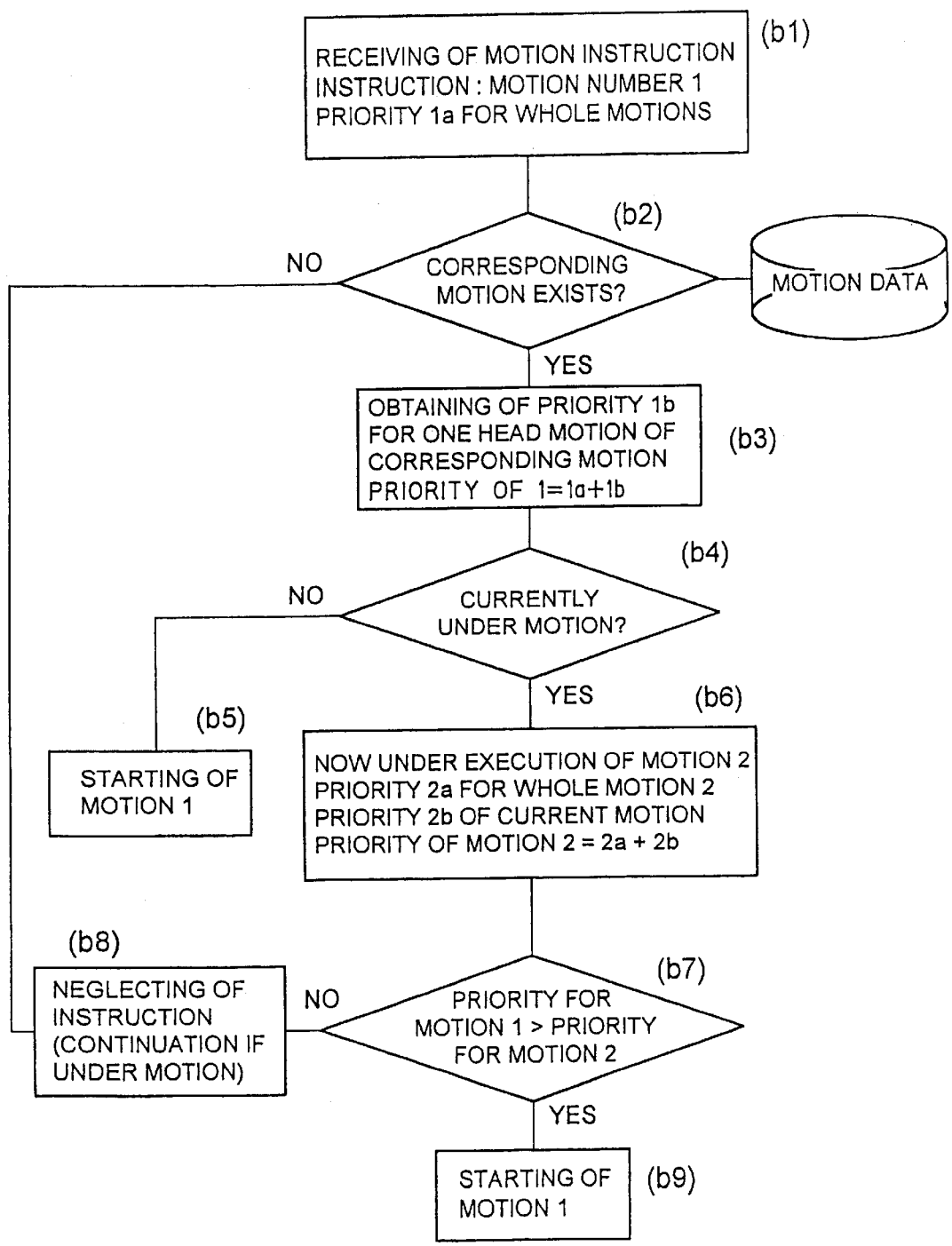
FIG. 8 shows a view of a decision flow of the robot motion considering priorities.

FIG. 8 shows a view of a decision flow of the robot motion considering the priorities.

In the first place, the robot motion editing/control program receives the motion instruction for the robot motion (step b1). Here, it is assumed that the motion number of the motion instruction is 1, and the priority of the whole motions is 1a.

When the motion instruction is received, it is judged whether the corresponding motion exists or not (step b2). The instruction is neglected (step b8) in the case of no corresponding motion. Then, the motion under execution is continued if there is the executing motion at the reception.

On the other hand, when it is decided at step b2 that the corresponding motion exists, the priority 1b for the head motion of the motion 1 corresponding to the motion instruction is obtained, and the priority of the motion 1 is obtained by 1a+1b (step b3).

It is judged at step b4 whether the robot is now under motion or not, and the motion 1 corresponding to the motion instruction currently received is executed (step b5), in the case of no robot under motion. When the robot is under motion, the priority 2a+2b of the current motion under execution is obtained (step b6), based on the priority 2a of the whole motions (a series of motions) 2 under execution, and the priority 2b of the unit motion, which is just under execution, of the motion 2. When the priority of the motion 2 is higher at comparison between the priority of 1a+1b of the motion 1, and the priority of 2a+2b of the motion 2 (step b7), the motion 2 is continued (step b8), and when the priority of the motion 1 is higher, the motion 2 is stopped and the motion 1 is started.

As described above, the collision of the motion is configured to be avoided by decision of the motion based on the priority given to the motion in the present embodiment.

Figure 9:
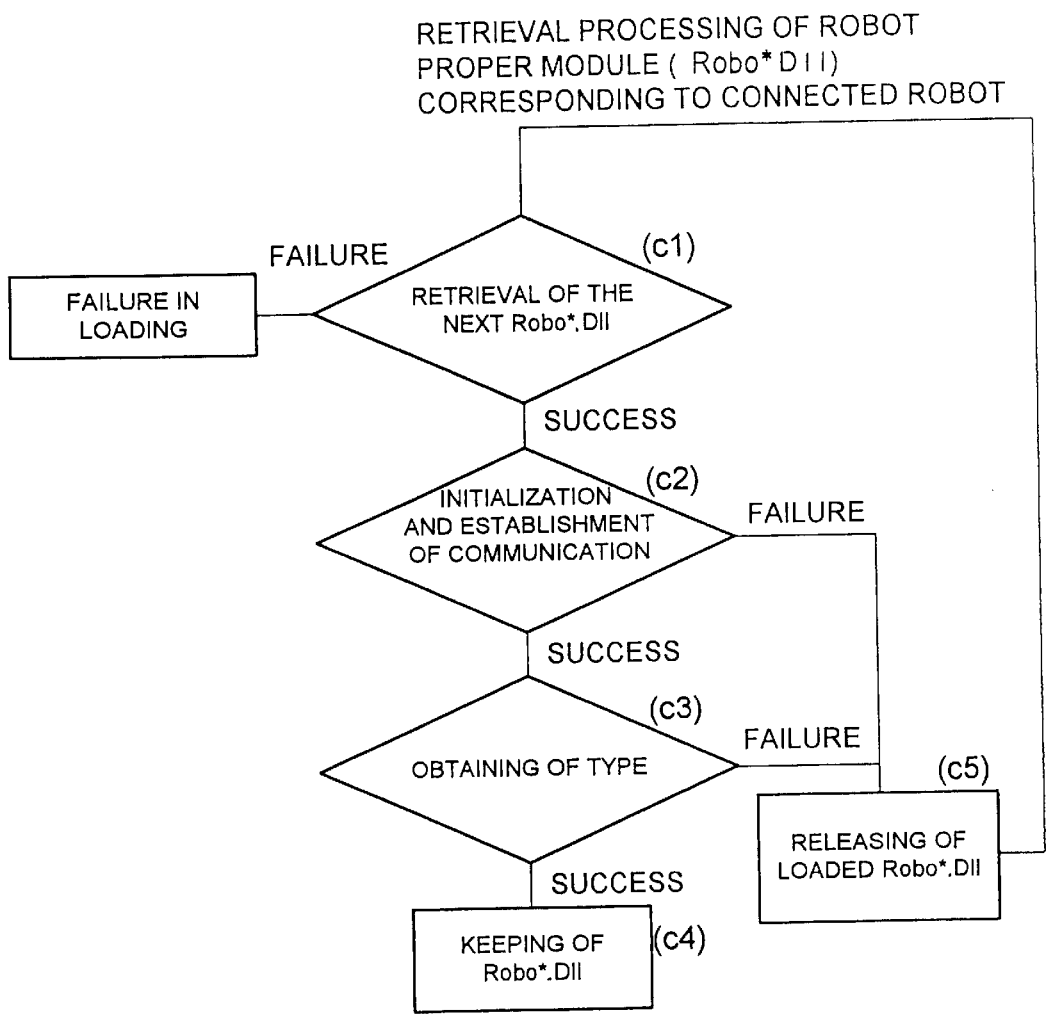
FIG. 9 shows a flowchart of automatic loading of a robot proper module.

FIG. 9 shows a flowchart of automatic loading of the robot proper module.

In the computer, at starting the system shown in FIG. 2, a robot proper module suitable for the connected robot according to the flowchart shown in FIG. 9 is made executable by the robot motion editing/control program.

In the first place, the existence of the robot proper module Robo*.D11 is retrieved at step c1. When the robot proper module is not identified, the retrieval is judged to be a failure.

When the robot proper module is identified, the robot proper module is loaded, and initialization and establishment of communication with the robot is attempted (step c2). In the case of failure in the establishment of the communication, for example, due to the difference of the communication specifications between the robot proper module and the robot, the loaded robot proper module is liberated (step c5), and the operation is returned to step c1 to retrieve existence of the next robot proper module.

In the case of success in the establishment of the communication at step c2, information on the type of the robot is obtained from the robot, and compared with the robot type information which the robot proper module has for judging whether both the types are in coincidence (step c3). In the case of no coincidence in the types, the robot proper module is released (step c5), and the existence of the next robot proper module is retrieved (step c1). In the case of coincidence in the types, the robot proper module is kept under operation as the robot proper module is suitable for the connected robot.

By following the above procedures, there is no need for a user to explicitly perform switching of the robot proper module, and appropriate loading of the robot proper module is always performed.

Figure 10:
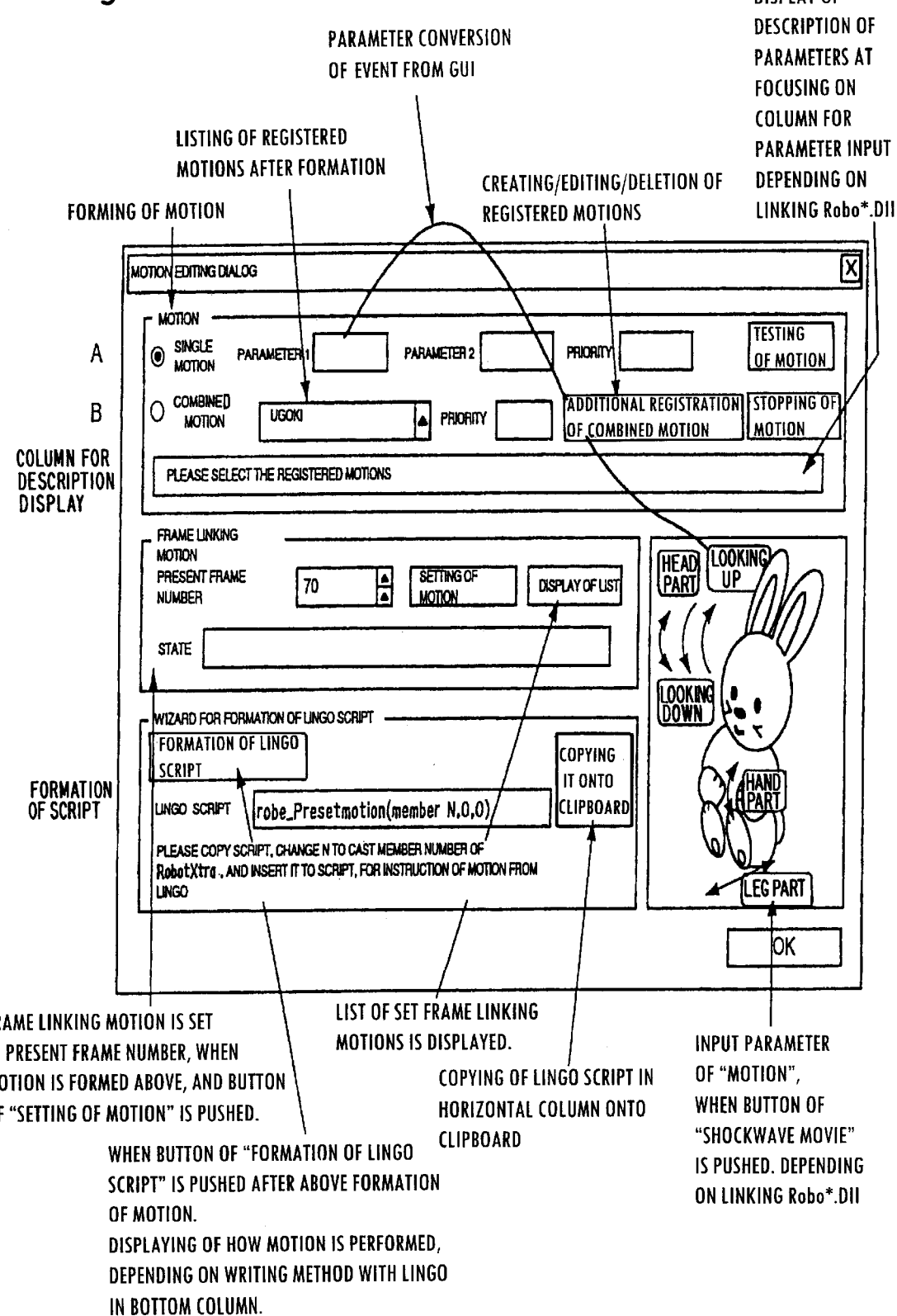
FIG. 10 shows a view of a screen of a motion editing editor to perform motion editing of the robot.
Figure 11:
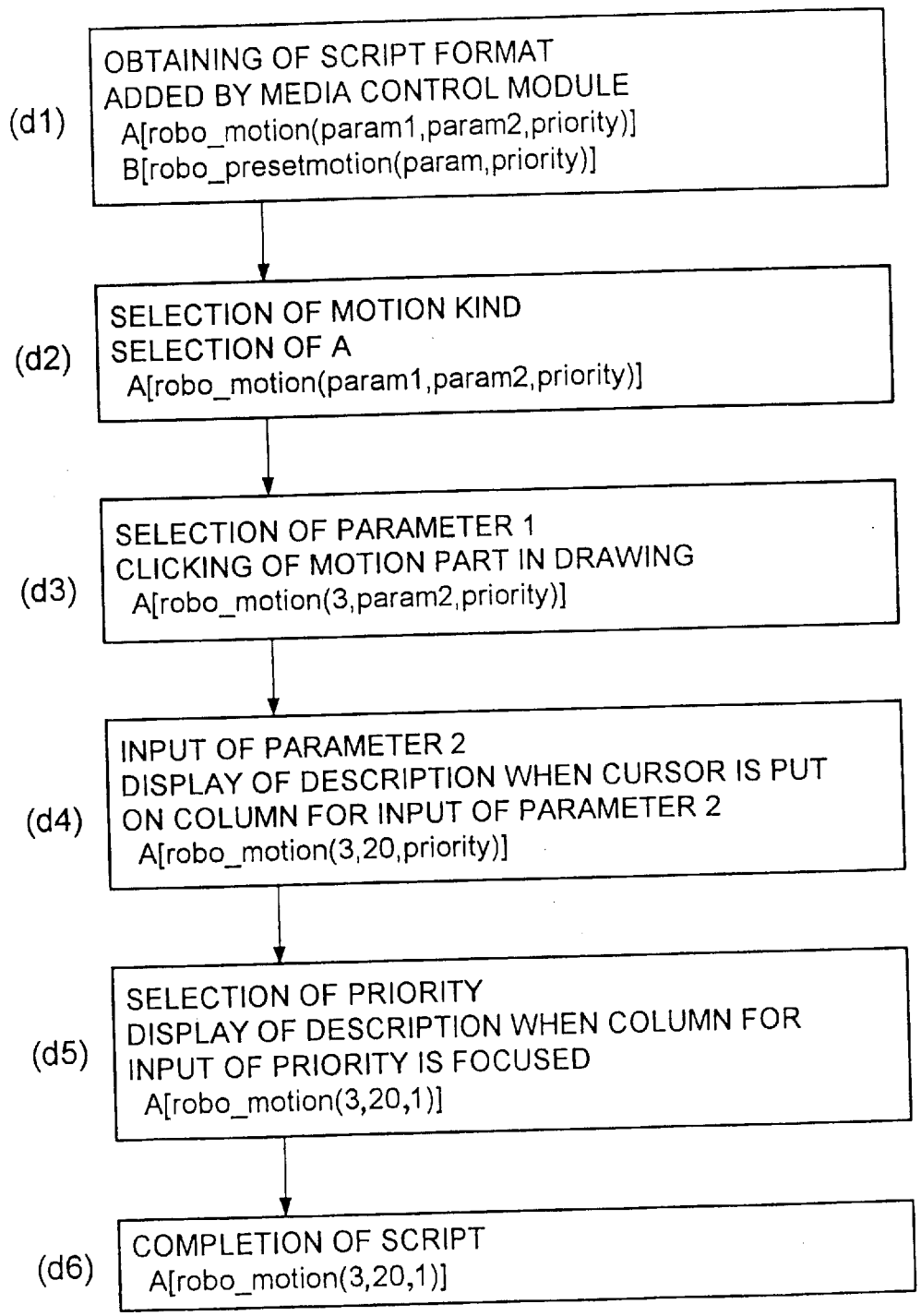
FIG. 11 shows a forming procedure of a script denoting robot motions under operation of the screen in FIG. 10 with GUI.

FIG. 10 shows a view of a screen of a motion editing editor to perform motion editing of the robot. FIG. 11 shows a forming procedure of a script denoting robot motions under operation of the screen in FIG. 10 with GUI.

In FIG. 10, an image illustrating the robot is shown with buttons defining the motions of the robot. The above information is information kept in the robot proper module as a part of robot information. The motion editing editor in the robot motion editing/control program obtains the above information from the robot proper module for display on the screen shown in FIG. 10. Therefore, when the connected robot is changed, as described above, the robot proper module is also changed according to the above changing, and the robot image and the buttons for definition of the motions which are displayed on the screen are changed.

Moreover, the data which are added to the multimedia contents editing execution system in the script format are kept in the media control module (for the robot), and the motion editing editor in the robot motion editing/control program obtains the script format added by the media control module to the multimedia contents editing execution system from the media control module (steps d1 in FIG. 11). In the above script format, there are two kinds of motions, that is, a single motion, a combined motion (a series of motions, to which motion names such as happy motion and sad one and the like as described referring to FIG. 5, are called as combined motions). They are, respectively, shown as follows:

(A) single motion: robo_motion (param1, param2, priority), and (B) combined motion: robo_preset motion (param, priority).

Here, "robo_motion" and "robo_preset motion" shows that they are a single motion and combined motions, respectively. The "param1" in the single motion is a parameter denoting the kind of the single motion; and the "param2" one denoting, for example, the speed of the motion. And the "param" in the combined motion is a parameter denoting the kind of the combined motion. Moreover, "priority" in the single, and the combined motions a parameter for showing the above-described priority of the motion.

A user selects a single motion and combined motions (step d2) with the GUI (for example, mouse operation) on the motion editing screen shown in FIG. 10. Here, it is assumed that the single motion is selected.

Then, in order to specify the parameter param1, the clicked event is converted into the parameter param1 by clicking the button for setting the motion, which is displayed with the image of the robot (step d3).

Thereafter, the description of the parameter 2 is displayed on the column for display of the description, when a mouse cursor is put on the input column for the parameter 2 at specification of the above parameter param2. In some case, the above description depends on the kind of the robot, even if the parameter 1 is the same (for example, nodding of the robot head is performed in any case). The above explanatory memorandum is also kept in the robot proper module as a part of the robot information. The user may correctly input the pattern 2 after reading the explanatory memorandum (step d4).

Then, the description of the priority is displayed on the column for display of the description, in a similar way to that of the parameter 2 when the mouse cursor is put on the column for the priority at specification of the above "priority". The user may correctly input the priority after reading the explanatory memorandum (step d5).

As mentioned above, the script denoting the robot motion is completed (step d6).

Forming of the script of the single motion has been described above. On the other hand, a predetermined registration motion is selected from a list where registration motions which have been formed are listed at forming the script of the combined motions. When the required combined motion is not registered, a button of "Additional registration of combined motions" is pushed, and a new combined motion is defined for additional registration. Detailed description will be eliminated.

When the script, which has been completed as described above, is linked to a frame, the current frame number is selected, and a button of "Setting of motion" is pushed. Thereby, the script is related to the frame number.

Moreover, when the script which has been completed is not linked to the frame, for example, associated with an event, such as a GUI operation of the user, it is inserted into a LINGO function in correspondence with the specified event, as a LINGO script described in the script language which is called LINGO, in the present embodiment. In the above case, when the specified event occurs, the robot is configured to be moved according to the LINGO script described there. Here, the button of "Copying it onto clipboard" on the screen in FIG. 10 has a function to copy the LINGO script described at the side in a list called a clipboard for the future use.

In the present embodiment, an intuitive specification of the robot motion may become possible at forming the script showing the motions of the robot, as the value of a part of parameters are specified by a button operation. Also, specification of parameters which cannot be specified by the button operation may be also easily performed, as explanatory memorandums saying that the above parameters cannot be specified by the button operation are displayed.

Figure 12:
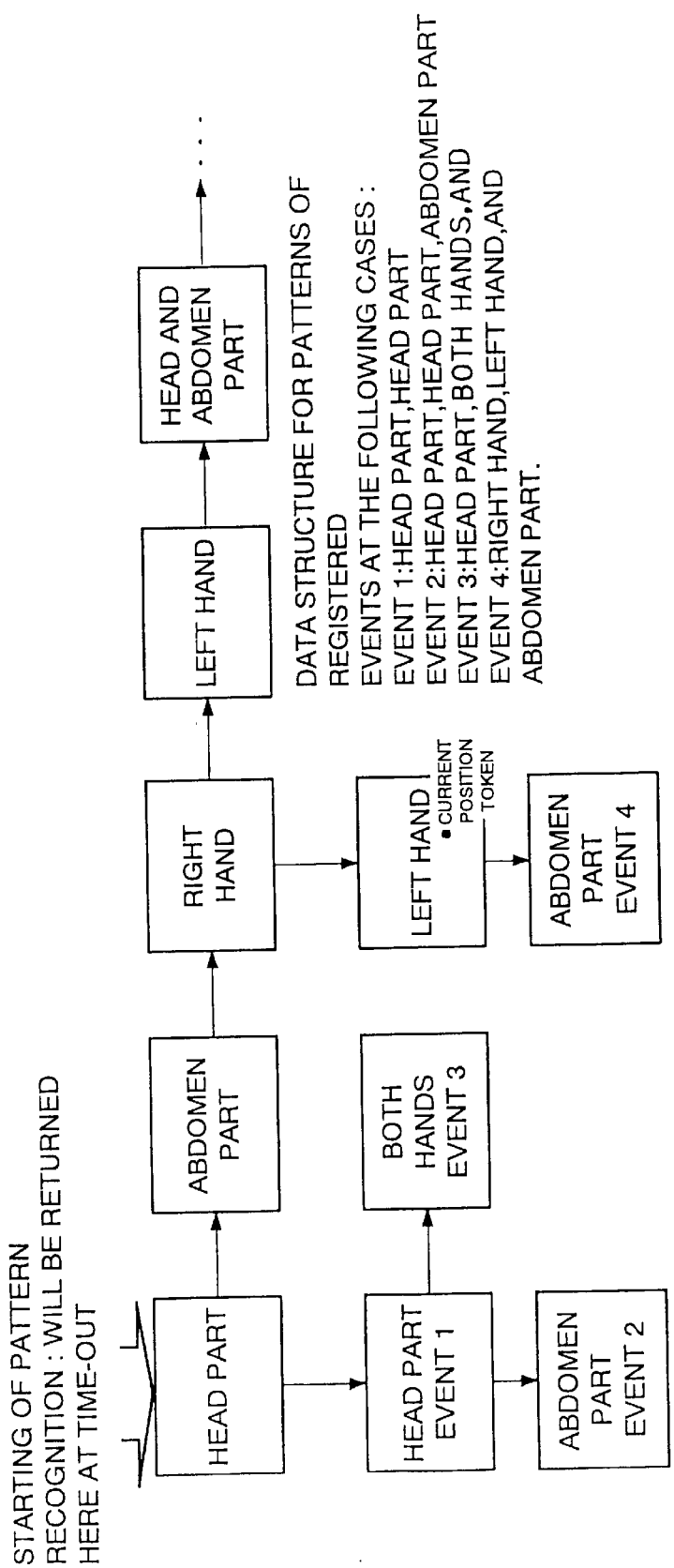
FIG. 12 shows a view of a data structure denoting a relation between sensor detection patterns and events.

FIG. 12 shows a view of a data structure denoting a relation between the sensor detection patterns and the events.

FIG. 12 shows that, for example, when the head part of the robot is tapped two times (sensors which are sequentially provided output detection signals two times), an event 1 is issued, and when the abdomen part is touched after the head part is tapped two times, an event 2 is issued.

In the present embodiment, a relation, which is shown in FIG. 12, between the sensor detection patterns of the robot and the events is registered in the robot motion editing/control program. When the user performs an action to the robot, an event to the multimedia contents editing execution system is issued at a predetermined sensor detection pattern according to the flow described below.

Figure 13:
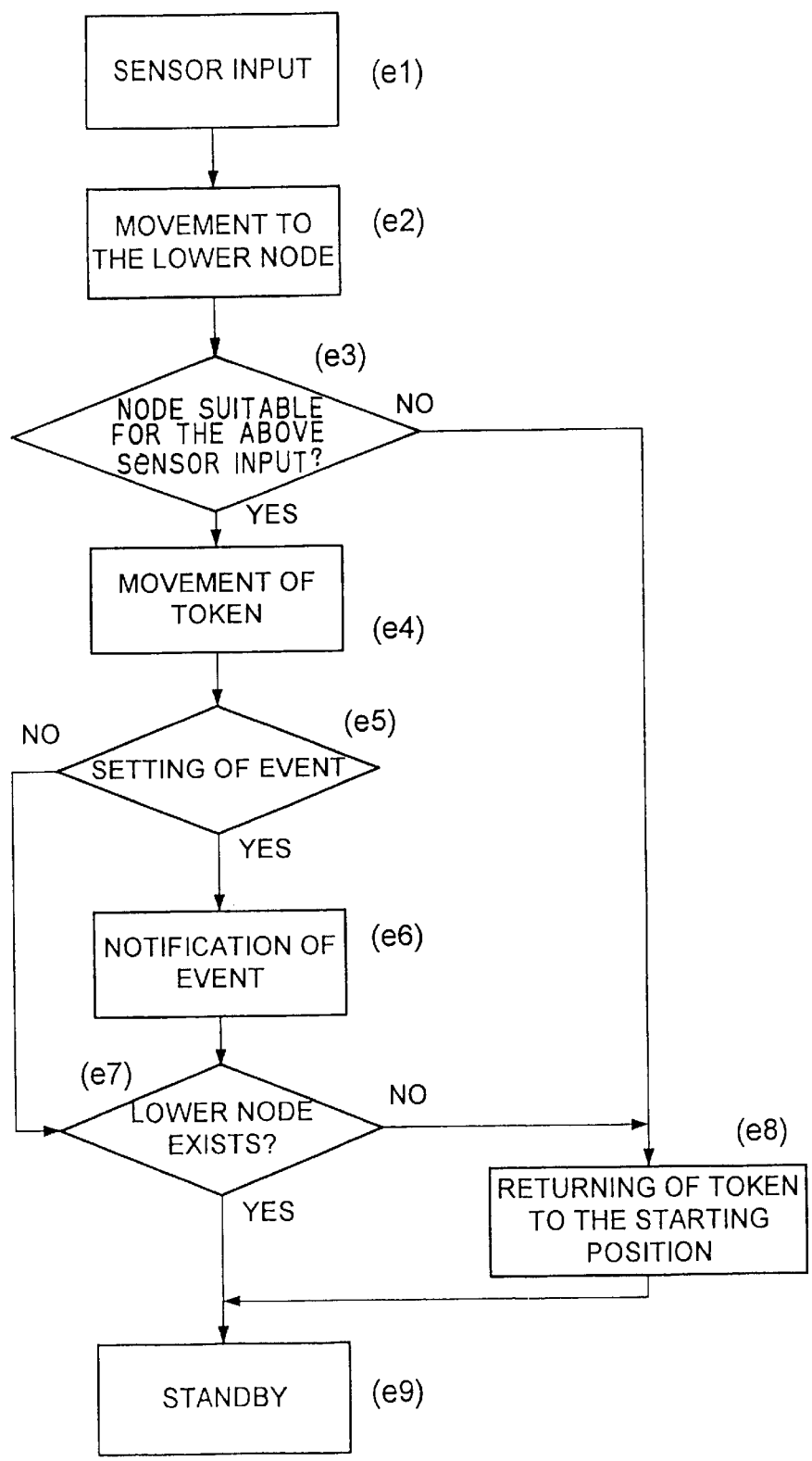
FIG. 13 shows a flow for retrieval of sensor detection patterns, and notification of events.

FIG. 13 shows a flow for retrieval of sensor detection patterns and notification of events.

When a user operates the robot, and there is a sensor input (step e1), there is a movement from the current node to the lower node (step e2). It is judged whether the above node is suitable for the sensor input (step e3). When it is not suitable, a token (current position in the data structure shown in FIG. 12) is returned to the starting position.

When it is judged that it is suitable node for the sensor input at step e3, the token is moved (step e4) for judgement (step e5) whether the event is set for the node. When there is set the event, notification of the event is performed (step e6). It is further judged at step e7 whether the lower node exists or not, and when there is no lower node, the token is returned to the start position (step e8). When there is the lower node, the token stays at the current position and is in a waiting state for the next sensor input.

Whenever there is a sensor input, the flow in FIG. 13 is executed, and an event is notified only when there is a predetermined specific sensor input pattern.

Here, though not explicitly shown in FIG. 13, the token is returned to the starting point when there is no next sensor input in a predetermined time.

Thus, unnecessary event may be prevented to be sent by sending the above input as one event to the contents editing execution system only when there is a sensor input of a specific pattern.

In FIG. 12 and FIG. 13, an event is configured to be notified only when there are at least two sensors. However, in some case, an event may be configured to be notified when there is one sensor input, by correspondence of an event with the head node.

As described above, the robot operation linked to the motion of the image may be realized, according to the present invention.

What is claimed is:

1. A robot cooperation device comprises:
    a robot control part connected to a robot moving according to control for controlling the motion of the robot; and
    a media reproduction part to keep scenarios, which describes changes in the images to the passage of time, and are corresponding to events; present images according to the passage of time, following the scenarios; and notify the passage of time at each frame to said robot control part, characterized in that said robot control part keeps motion procedures denoting changes, which are corresponding to the frame, in the postures of said robot to the passage of time; receives notifications of the passage of time from said media reproduction part; and moves said robot according to said motion procedures, in the corresponding frame.

2. A robot cooperation device according to claim 1, wherein
    said robot connected with said robot control part comprises a sensor to transmit a sensor detection signal to the robot control part; and
    said robot control part transmits events corresponding to the transmitted sensor detection signals to said media reproduction part, characterized in that
        said media reproduction part starts or branches said scenario according to the events which has been transmitted from said robot control part.

3. A robot cooperation device according to claim 1, characterized in that
    said media reproduction part further keeps the scenario where the voice instruction to the passage of time is described, other than changes of the images to the passage of time; presents the images and the voices to the passage of time according to the scenario; and notifies the passage of time for each frame to said robot control part.

4. A robot cooperation device according to claim 1, wherein
    said media reproduction part notifies the passage of time for each frame to said robot control part, and requests the motion of said robot, and characterized in that
        said robot control part receives the request for the robot motion from said media reproduction part to perform a motion corresponding to the motion request.

5. A robot cooperation device according to claim 4, wherein
priority is given to the motions of said robot, and characterized in that
said robot control part continues or switches the motions, according to comparison results between the priority of the motion under execution and that of the motion corresponding to the requested motion, when the request for the robot motion from said media reproduction part is received during motion of said robot.

6. A robot cooperation device according to claim 1, characterized in that
said robot control part comprises:
a robot proper module which is activated according to the type of the robot connected to the robot control part, and controls the motion of the robot; and
a robot common module to keep said motion procedures, and to give the robot proper module instructions to perform motions according to said motion procedures.

7. A robot cooperation device according to claim 6, characterized in that
it comprises a connection robot retrieval part which identifies the type of the robot connected to said robot control part by retrieval, and activates the robot proper module among robot proper modules, according to the identified type of the robot connected to the robot control part.

8. A robot cooperation device according to claim 1, characterized in that
it comprise:
a display part to display an image expressing the robot connected to said robot control part with buttons for definition of motions of the robot;
an operation part for operation including operation of the buttons displayed on the display part; and
a script forming part to form script describing the motions of said robot according to the operation of said operation part.

9. A robot cooperation device according to claim 1, wherein
the robot connected to the robot control part comprises a plurality of sensors, and each sensor detection signal is transmitted to the robot control part;
said robot control part stores the order of a part of or all of said plurality of sensors; and events are transmitted to said media reproduction part according to said order when said sensor detection signals are received from said robot in the stored order; and characterized in that
said media reproduction part starts or branches said scenario according to the event transmitted from said robot control part.

10. A robot cooperation program storage medium, wherein
it is loaded in a computer to which a robot moving according to control is connected; and
the computer comprises:
a robot control part to control the motion of the connected robot; and
a media reproduction part to describe changes of images to the passage of time; to keep a scenario corresponding to events; to present the images according to the passage of time following the scenario; and to notify the passage of time for each frame to said robot control part; and characterized in that
said robot control part keeps motion procedures denoting changes, which are corresponding to the frame, in the postures of said robot to the passage of time; receives notifications of the passage of time from said media reproduction part; and stores a robot cooperation program to move said robot in the corresponding frame according to said motion procedures as the robot cooperation device.

11. A robot cooperation program storage medium according to claim 10, wherein
a robot connected to said computer comprises a sensor to transmit a sensor detection signal to said computer; and
said robot control part transmits events corresponding to the transmitted sensor detection signals to said robot control, characterized in that
said media reproduction part starts or branches said scenario according to the events which has been transmitted from said robot control part.

12. A robot cooperation program storage medium according to claim 10, characterized in that
said media reproduction part further keeps the scenario where the voice instruction to the passage of time is described, other than changes of the images to the passage of time; presents the images and the voices to the passage of time according to the scenario; and notifies the passage of time for each frame to said robot control part.

13. A robot cooperation program storage medium according to claim 10, wherein
said media reproduction part notifies the passage of time for each frame to said robot control part, and requests the motion of said robot, and characterized in that
said robot control part receives the request for the robot motion from said media reproduction part to perform a motion corresponding to the motion request.

14. A robot cooperation program storage medium according to claim 10, wherein
priority is given to the motions of said robot, and characterized in that
said robot control part continues or switches the motions, according to comparison results between the priority of the motion under execution and that of the motion corresponding to the requested motion, when the request for the robot motion from said media reproduction part is received during motion of said robot.

15. A robot cooperation program storage medium according to claim 10, characterized in that
said robot control part comprises:
a robot proper module which is activated according to the type of the robot connected to the computer, and controls the motion of the robot; and
a robot common module to keep said motion procedures, and to give said robot proper module instructions to perform motions according to said motion procedures.

16. A robot cooperation program storage medium according to claim 15, characterized in that
it comprises a connection robot retrieval part which identifies the type of the robot connected to said computer by retrieval, and activates the robot proper module, among robot proper modules, according to the identified type of the robot connected to the computer.

17. A robot cooperation program storage medium according to claim 10, characterized in that
it comprise:

a display control part to display an image expressing the robot, with buttons for definition of motions of the robot; and a script forming part to form script describing the motions of said robot according to the operation including the operation of the displayed buttons.

18. A robot cooperation program storage medium according to claim 10, wherein the robot connected to said computer comprises a plurality of sensors, and each sensor detection signal based on each sensor is transmitted to said computer;

said robot control part stores the order of a part of or all of said plurality of sensors; and events are transmitted to said media reproduction part according to said order when said sensor detection signals are received from said robot in the stored order; and characterized in that said media reproduction part starts or branches said scenario according to the event transmitted from said robot control part.

* * * * *